Aug. 28, 1951     S. F. SANDULA     2,566,145
MACHINE TOOL ATTACHMENT
Filed Oct. 3, 1946
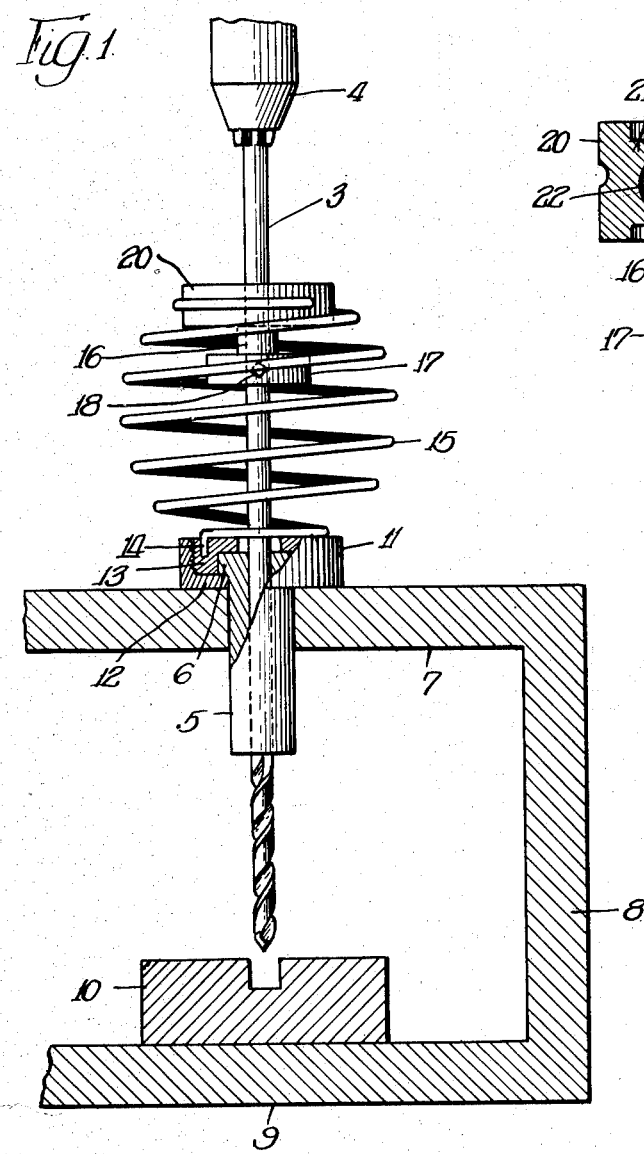
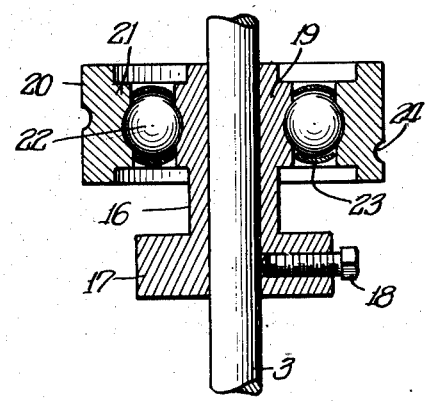
INVENTOR.
Stanley F. Sandula,
BY Patented Aug. 28, 1951

2,566,145

UNITED STATES PATENT OFFICE 2,566,145

MACHINE-TOOL ATTACHMENT

Stanley F. Sandula, Chicago, Ill.

Application October 3, 1946, Serial No. 700,851

5 Claims. (Cl. 77—55)

The present invention relates to drills, reamers or like machine tools, and has for its principal object the provision of means for attaching bushings to drills or like machine tools.

In tool machines the tool is usually passed through a bushing supported within a fixture. When a drill is withdrawn from the machine, the bushing must also be withdrawn when a tool of different diameter is to be used. This requires two separate manual operations. The present invention contemplates the provision of suitable connecting means between the tool and the bushing in order that the two may be simultaneously handled while removing the same from the machine, thereby saving time, and which connecting means may not detract from a normal function of the tool.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views:

Fig. 1 is a side elevational view of the drill, with a bushing through which the drill is passed in an operative position, the bushing being partly in section, with the connecting device between the drill and the bushing in the operative position; and Fig. 2 is an enlarged cross-sectional view through a bearing member which supports and engages the tool.

Referring to the present drawing in detail there is shown drill 3 engaged at its upper end by chuck 4. Bushing 5, including flanged head 6, is passed through fixture 7 wherein it is normally supported. Bushing 5 has central bore through which drill 3 is passed. Fixture 7 has downwardly depending wall 8 which integrally connects with base 9 on which work 10 is supported. All the above parts are known in the art.

When drill 3 is withdrawn from bushing 5, the latter must also be withdrawn from fixture 7 and a bushing having a bore of a diameter corresponding to that of a different tool must be substituted, when a tool of a different diameter is required for use.

The present invention contemplates connecting means between the bushing and the machine tool, so that the two may be simultaneously placed into or withdrawn from the machine.

Inwardly threaded ring 11 is provided with an annular flange 12 through which bushing 5 extends and upon which head 6 rests. Connected in a threaded relation with said ring 11 is cap 13, which by its horizontal portion overlies said head 6 and by its vertical annular portion extends to and contacts with said flange 12. Thus, ring 11, flange 12 and cap 13 constitute a housing within which head 6 is receivable in a clamped position, and from which bushing 5 may be disconnected and other bushings interchangeably substituted. Said cap 13 at its horizontal portion is provided with the central opening, in alinement with the bore in bushing 5, through which drill 3 extends. Said opening may be of a diameter larger than said bore in bushing 5 so that tools of various diameters may be extended therethrough.

Attached to said cap 13 by its embedded vertical end stem 14 is a helical coil spring 15, which on vertical plane is of substantially circular formation.

Cooperating with the shank of drill 3 and disposed above bushing 5 is sleeve 16, provided at its lower end with an integrally formed annular flange 17, through which set screw 18 is passed for engaging drill 3 and keying the same to said sleeve 16.

Integrally formed with the upper end of sleeve 16 is an inner race 19. Encompassing said race 19 in a spaced relation is ring 20 provided with outer race 21 on its inner face. Both said races 19 and 21 are provided with opposed arcuate grooves within which a ball-bearing of a plurality of spaced balls 22 is positioned. Annular rings 23 positioned between races 19 and 21, provided with spacing depressions, maintain said balls 22 in mutual spaced relation.

Helical groove 24, made on the outer face of ring 20 receives the coil of the upper end of spring 15 wherein the same is maintained in a frictional engagement with said ring 20. Thus, said spring is simply slipped on or from said groove 24 when it is desired to connect with or disconnect the same from said ring 20.

From the hereinabove description it will be seen that sleeve 16, flange 17 and race 19 all rotate with drill 3 during the operation of the latter, due to the rigid engagement thereof with said drill 3 through set screw 18. Race 19 rotates within ring 20, being guided in its rotary movement by balls 22. During the rotation of drill 3 ring 20, spring 15 and bushing 5 remain stationary.

When drill 3 is disengaged from chuck 4, the former may then be withdrawn from fixture 7, simultaneously with bushing 5, because the latter is connected with said drill 3 through spring 15 and ring 20. This saves time for the operator, because otherwise the operator would have to remove separately the drill and then the bushing.

It is further observed that during the operative position of drill 3 bushing 5 is supported by and upon fixture 7. During the operation of drill 3 bushing 5, ring 11, flange 12, cap 13, spring 15 and ring 20 remain stationary. Only drill 3 and sleeve 16 with flange 17 and race 19, the latter three constituting a bearing, rotate with said drill 3. During the downward shifting movement of drill 3, as boring operation in work 10 progresses, spring 15 gradually compresses, and due to the construction of said spring 15 hereinabove described the same may be compressed to the maximum extent, that is until the strands of said spring 15 are brought into a mutual contact.

While there is described herein preferred embodiments of the present invention, it is nevertheless to be understood that minor changes may be made therein without departing from the spirit and scope of the invention as claimed.

What I claim as new is:

1. In a machine tool attachment, a guide member provided with a bore for guiding a drill or like tool having a shank thereon, a bearing carried upon the shank of said drill or like tool, clamping means provided on said bearing for locking the bearing to said shank, an anti-friction member within which said bearing is positioned for rotary movement, and a coil spring connecting said guide member and said anti-friction member and constituting the sole connection therebetween whereby said guide member may be simultaneously removed with the drill or like tool from the machine, said coil spring being in an encompassing relation with the drill or like tool.

2. In a machine tool attachment, a guide member provided with a bore for guiding a drill or like tool having a shank thereon, a bearing carried upon the shank of the drill or like tool, clamping means provided on said bearing for locking the bearing to said shank, an anti-friction ring encompassing said bearing, said anti-friction ring permitting rotary movement of said bearing therewithin but preventing shifting movement thereof into the longitudinal direction with relation to the shank of the drill or like tool, and a coil spring encompassing the drill or like tool and connecting said guide member and said anti-friction ring and constituting the sole connection therebetween for permitting removal of said guide member from the machine simultaneously with the drill or like tool.

3. In a machine tool attachment, a guide member provided with a bore for guiding a drill or like tool having a shank thereon, a bearing carried upon the shank of the drill or like tool, clamping means provided on said bearing for adjustably locking the bearing to said shank, an anti-friction ring encompassing said bearing, said anti-friction ring permitting rotary movement of said bearing therewithin but preventing shifting movement thereof into the longitudinal direction with relation to the shank of the drill or like tool, and a coil spring encompassing the drill or like tool and connecting said guide member and said anti-friction ring for permitting removal of said guide member from the machine simultaneously with the drill or like tool, said anti-friction ring being provided on its periphery with a helical groove whereinto one end of said coil spring may be slipped for frictional engagement with said anti-friction ring.

4. In a machine tool attachment, a bushing provided with a bore for guiding a drill or like tool having a shank thereon, a flanged head carried by one end of said bushing, a housing member releasably engaging said flanged head, a bearing carried upon the shank of the drill or like tool in a longitudinally adjusted relation therewith, means for detachably clamping said bearing to said shank, an anti-friction ring encompassing said bearing, said anti-friction ring permitting rotary movement of said bearing therewithin but preventing shifting movement thereof into longitudinal direction with relation to the shank of the drill or like tool, and a coil spring encompassing the drill or like tool and connecting said housing member and said anti-friction ring for permitting removal of said bushing from the machine simultaneously with the drill or like tool, said anti-friction ring being provided on its periphery with a helical groove wherein one end of said coil spring may be positioned for frictional engagement with said anti-friction ring.

5. In a machine tool attachment, a guide member provided with a bore for guiding a drill or a like tool having a shank thereon, a bearing carried upon the shank of the said drill or like tool clamping means provided on said bearing for locking the bearing to said shank, an antifriction member within which said bearing is positioned for rotary movement, said bearing and anti-friction member being connected to each other so that there is no relative axial movement therebetween and resilient means connecting said guide member and said antifriction member and constituting the sole connection therebetween whereby said guide member may be simultaneously removed with the drill or like tool from the machine.

STANLEY F. SANDULA.

REFERENCES CITED

The following references are of record in the file of this patent:

UNITED STATES PATENTS

| Number | Name | Date |
|---|---|---|
| 1,831,813 | Leveahl | Nov. 17, 1931 |
| 2,170,211 | Osborne | Aug. 22, 1939 |
| 2,198,288 | Leaman | Apr. 23, 1940 |
| 2,210,128 | Rohr | Aug. 6, 1940 |
| 2,296,087 | Burns | Sept. 15, 1942 |
| 2,375,112 | Kanihan | May 1, 1945 |
| 2,414,292 | Ewert | Jan. 14, 1947 |

FOREIGN PATENTS

| Number | Country | Date |
|---|---|---|
| 645,873 | France | Sept. 3, 1928 |
| 545,524 | Germany | Mar. 2, 1932 |